United States Patent
Morita

[11] Patent Number: 5,939,859
[45] Date of Patent: Aug. 17, 1999

[54] BATTERY CHARGER WITH BODY SLOT AND CATCH ARRANGEMENT TO PREVENT INCORRECT BATTERY ORIENTATION

[75] Inventor: Hideyo Morita, Mihara-gun, Japan

[73] Assignee: Sanyo Electric Co., Ltd., Osaka, Japan

[21] Appl. No.: 09/010,512

[22] Filed: Jan. 21, 1998

[30] Foreign Application Priority Data

Jan. 23, 1997 [JP] Japan ................................ 9-010425

[51] Int. Cl.⁶ .................................................. H01M 10/46
[52] U.S. Cl. ........................................................... 320/112
[58] Field of Search ..................... 320/106, 107, 320/110, 112, 113, 115, FOR 101; D13/103, 107; 429/96, 97, 98, 100

[56] References Cited

U.S. PATENT DOCUMENTS

| | | | |
|---|---|---|---|
| 5,306,956 | 4/1994 | Ikeda et al. ................. | 320/113 X |
| 5,317,247 | 5/1994 | Chong et al. ................. | 320/112 |
| 5,592,064 | 1/1997 | Morita ....................... | 320/112 X |
| 5,780,993 | 7/1998 | Tsang ........................ | 320/112 X |

FOREIGN PATENT DOCUMENTS 5-12820  2/1993  Japan .

*Primary Examiner*—Edward H. Tso
*Attorney, Agent, or Firm*—Wenderoth, Lind & Ponack, L.L.P.

[57] ABSTRACT

A battery charger is provided with a connecting part for connection of a rechargeable battery in a freely removable fashion. The charger body has charger terminals protruding from the connecting part to electrically connect with battery terminals of the rechargeable battery. The connecting part of the charger body has a body slot and catch to allow connection thereto of only a particular rechargeable battery. The slot and catch of the body are designed to match with a battery slot and catch of the rechargeable battery when the appropriate rechargeable battery is normally connected to the connecting part, but to not match with the battery slot and catch when the connecting part of the rechargeable battery is abnormally connected. Both catches of the battery slot and catch and of the body slot and catch are provided to protrude at a location facing each other to prevent the electrical connection of the terminals when the battery slot and catch and the body slot and catch do not match each other.

26 Claims, 6 Drawing Sheets

BATTERY CHARGER WITH BODY SLOT AND CATCH ARRANGEMENT TO PREVENT INCORRECT BATTERY ORIENTATION

BACKGROUND OF THE INVENTION

The present invention relates to a charger for charging rechargeable batteries, and especially for recharging rechargeable batteries in the form of a battery pack.

A rechargeable battery that allows charging and discharging is mounted to the charger and charged. Numerous types of rechargeable batteries are present on the market and each of them requires an exclusive charger to be charged. Therefore, it is necessary to impede the mounting of a rechargeable battery on a charger other than its exclusive charger.

The rechargeable battery discussed in the Japanese Patent Publication No. 5-12820 issued Feb. 19, 1993, is provided with a slot and a catch on the battery cartridge and also on the face mounting the battery cartridge, to only allow the mounting of the appropriate battery case. The slot and the catch connect by latching the appropriate battery cartridge mounted thereon so as to make an electrical connection. This structure does not allow the connection of an inappropriate battery cartridge because the slots and catches do not match.

Furthermore, with this type of charger it is necessary to pay attention to the orientation of the rechargeable battery on the charger to ensure that the battery is not inverted on the charger. That is, it is necessary to prevent inverted connection of the battery to the charger which would cause the positive and negative terminals of the rechargeable battery to be connected to the negative and positive terminals of the charger, respectively.

With regard to the necessity of preventing the inverted connection of the battery to the charger to avoid having the positive and negative battery terminals of the rechargeable battery connected to the negative and positive charging terminals of the charger, respectively, as can occur in use of the charger disclosed in the formerly mentioned publication, it is not sufficient to simply impede the mounting of the rechargeable battery to the charger. This is because, even if the rechargeable battery cannot be fully mounted to the charger, there is a possibility that the battery terminals can be connected to the charging terminals in an inverted manner.

Here, the present invention does not only prevent the abnormal connection of the rechargeable battery to the charger, but also impedes the connection of the battery terminals to the charger terminals in an inverted manner.

The above and further objects and features of the invention will be more fully apparent from the following detailed description taken together with the accompanying drawings.

SUMMARY OF THE INVENTION

A battery charger according to the present invention is provided with a connecting part for connection of a rechargeable battery to the charger body in a freely removable fashion. The charger body is provided with charging terminals protruding for electrically connecting to the battery terminals of the rechargeable battery. Furthermore, the charger body is provided with a body slot and catch arrangement to allow mounting of only the appropriate rechargeable battery to the connecting part.

The body slot and catch arrangement fits a battery slot and catch arrangement of the rechargeable battery when the appropriate rechargeable battery is properly connected to the connecting part in the correct orientation. But when the rechargeable battery is abnormally connected to the connecting part (i.e. in an incorrect orientation), the body slot and catch arrangement is designed so that it does not fit the battery slot and catch arrangement. Further, the catches of the battery slot and catch arrangement and the body slot and catch arrangement are designed to protrude in opposite directions (i.e. toward one another), to prevent the electrical connection of the battery terminals and the charging terminals when the battery slot and catch arrangement and the body slot and catch arrangement do not fit with each other.

The charger of this structure is not only designed to reliably prevent the abnormal connection of the rechargeable battery via the slot and catch arrangements due to the respective catches being provided at positions facing each other to prevent the electrical connections of the charger terminals and of the battery terminals when the slot and catch arrangements do not fit, but also to prevent the inverted electrical connection of the rechargeable battery terminals with the charging terminals of the charger.

DETAILED DESCRIPTION OF THE INVENTION

Figure 1:
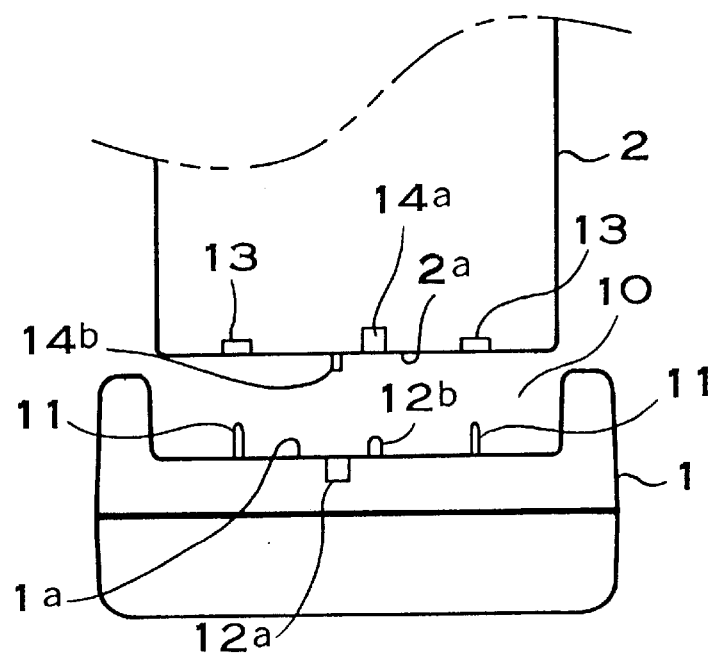
FIGS. 1(A) and 1(B) are side elevation views showing a first embodiment of the present invention.
Figure 1:
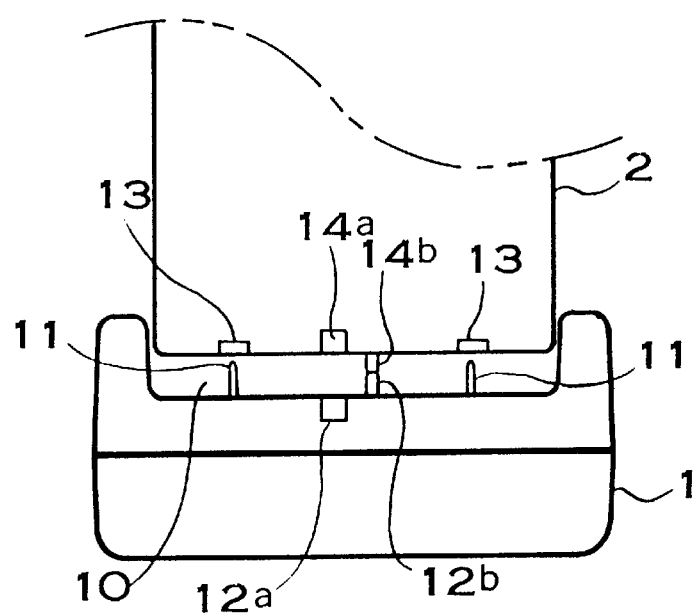

FIGS. 1(A) and (B) show a first embodiment of the present invention, including a charger body 1 and a battery pack 2 constituting a rechargeable battery.

In the charger body 1, a connecting part 10 is provided for connection of the battery pack 2. The connecting part 10 is provided on a connecting face 1a of the charger body 1, and charging terminals 11 are formed by elastic metallic pins protruding in the connecting part 10. A body slot and catch arrangement (comprising slot 12a and catch 12b) is located between the charging terminals 11. On the other hand, in the battery pack 2, battery terminals 13 are exposed on a connecting face 2a of the battery pack and face toward the connecting part 10. A battery slot and catch arrangement (comprising a battery slot 14a and a battery catch 14b) of the battery 2 is located between the battery terminals 13. Alternatively, the charging terminals can be located between the slot and catch of the charger body, and the battery terminals of the battery can be located between the slot and catch of the battery.

In the structure of this embodiment, when the battery pack 2 is normally connected to the charger body 1, the slot 12a and catch part 12b of the charger body 1 engage with the catch part 14b and slot 14a, respectively, of the battery pack, in a proper matching condition, the battery pack 2 is connected to the charger body 1, and the charging terminals 11 and the battery terminals 13 are correctly electrically connected.

On the contrary, as shown in FIG. 1(B), when the battery pack 2 is connected with the right and left sides inverted relative to the charger body 1, the slot 12a and catch part 14b of the charger body 1 do not engage with the catch part 14b and slot 14a of the battery pack 2, and the battery pack 2 is not connected to the charger body 1. Rather, the catch 12b of the charger body 1 and the battery catch 14b of the battery pack 2 are in a mutually facing relationship and, because their combined height is such that the charger terminals 11 and the battery terminals 13 cannot move close enough together (as illustrated in FIG. 1(B)), the charger terminals 11 and the battery terminals 13 are not electrically connected. Thus, the terminals of the charger and the battery pack cannot be inversely connected.

Figure 2:
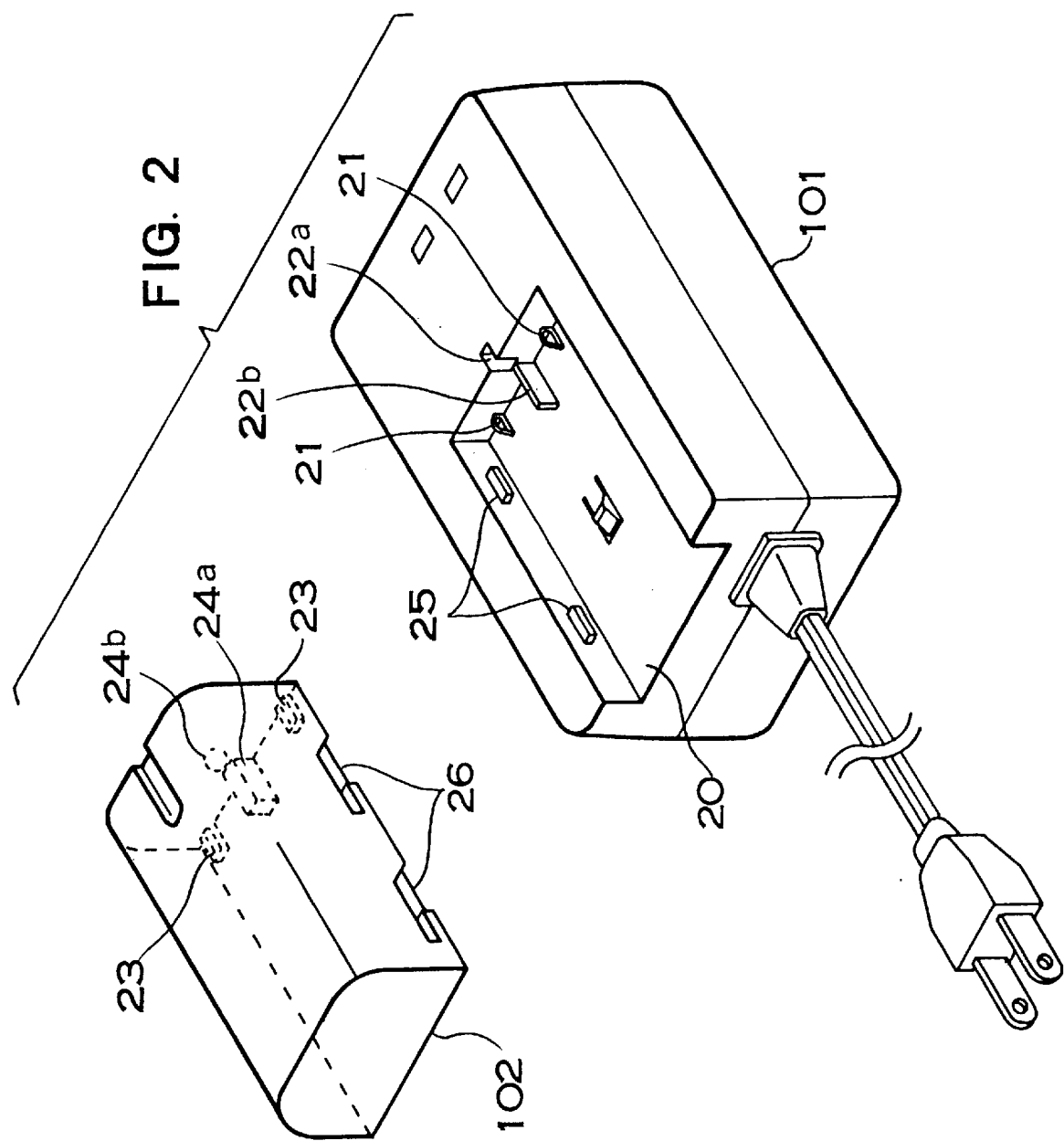
FIG. 2 is a perspective view showing a second embodiment of the present invention.

FIG. 2 shows the second embodiment of the present invention. In a charger body 101 of FIG. 2, a connecting part 20, located on the upper face of the charger body 101, is provided for connection to a battery pack 102. A pair of charging terminals 21 elastically protrude from the back edge of the connecting part 20, and a body slot 22a and catch 22b are located between the charging terminals 21 (in an alternative arrangement, the charging terminals can be located between the slot and catch). The body slot 22a is formed in a back wall of the connecting part 20, and the body catch 22b is provided on the bottom wall of the connecting part 20.

On the other hand, in the battery 102, a pair of battery terminals 23 protrude at the connecting face of the battery pack 102 towards the connecting part 20, and a battery slot 24a and catch 24b are located between the battery terminals 23 (in the alternative arrangement mentioned above, the battery terminals can be located between the slot and catch). The battery slot 24a is formed in the front mounting face of the battery pack 102 so as to face towards the bottom wall of the connecting part 20. The battery catch 24b is provided on the face of the battery pack 102 facing the back wall of the connecting part 20.

Furthermore, matching protrusions 15 are provided on the side walls of the connecting part 20 of the charger body 101, and matching recesses 26 are formed in the bottom of the side face of the battery pack 102 and match with the matching protrusions 25.

According to this structure, when connecting the battery pack 102 to the charger body 101, rear portions of the matching recesses 26 of the battery pack 102 are matched with the matching protrusions 25 of the connecting part 20, and then the battery pack 102 is slid toward the back wall of the connecting part 20. In this manner, the body slot 22a and catch 22b of the charger body 101 and the catch 24b and battery slot 24a of the battery pack 102, respectively, are placed in a mutually fitting condition. Thus, the battery pack 102 is connected to the charger body 101, and the charging terminals 21 and the battery terminals 23 are properly electrically connected.

On the contrary, when the battery pack 102, in the orientation shown in FIG. 2, is turned upside-down by mistake or on purpose, and when it is raised at a tight angle (e.g. such that the bottom face of the battery faces generally rearwardly and the rear face faces generally downwardly) and moved toward the charger body 101, the charging terminals 21 of the charger body 101 and the battery terminals 23 of the battery pack 102 are placed in an orientation which would, if not for the precautions of the present invention, allow an electrically inverted connection (i.e. in which the battery terminals contact the wrong charging terminals). However, according to the invention, the body slot 22a and catch 22b of the charger body 101 and the battery slot 24a and catch 24b of the battery pack 102 do not fit, because the body catch 22b of the charger body 101 and the battery catch 24b of the battery pack 101 move into facing contact with each other. Further, when the catches 22b, 24b are in facing contact, because their combined height is such that the charger terminals 21 and the battery terminals 23 cannot move close enough together to make mutual contact, the charger terminals 21 and the battery terminals 23 cannot electrically connect.

Figure 3:
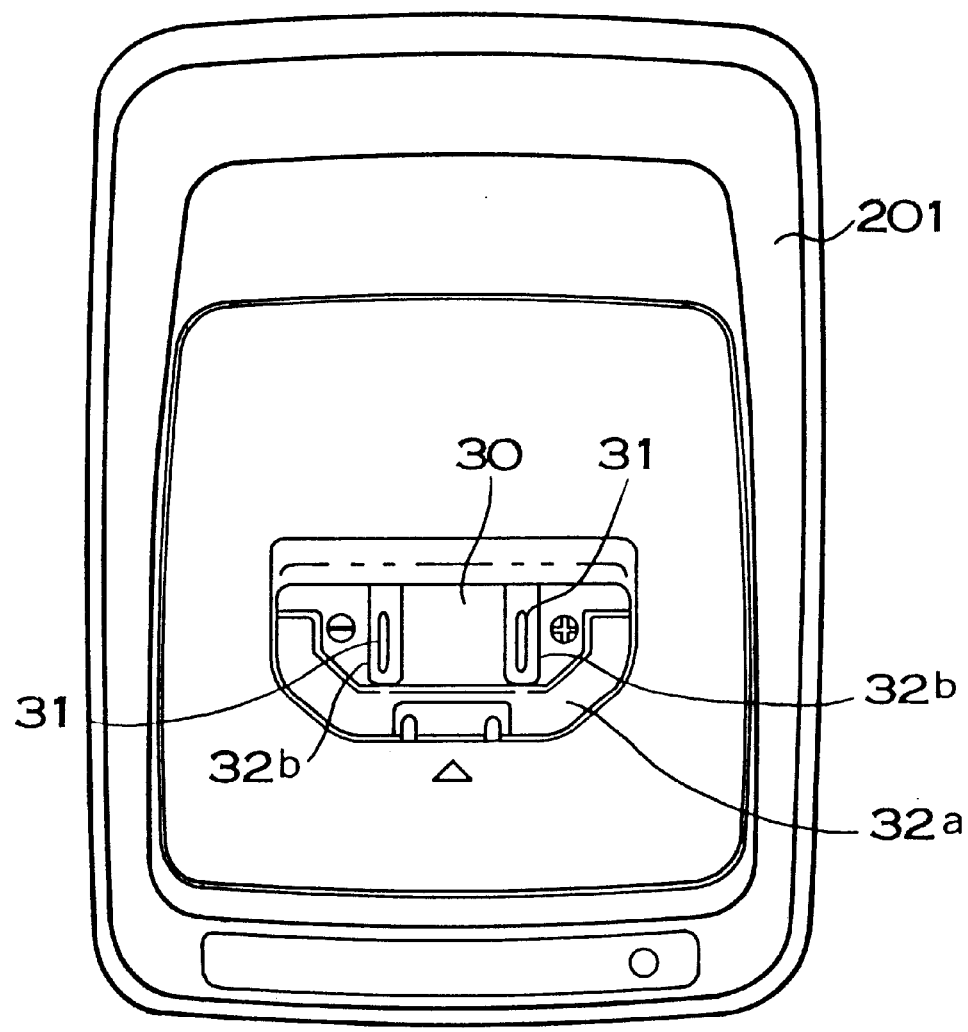
FIG. 3 is a plan view showing a third embodiment of the present invention.
Figure 4:
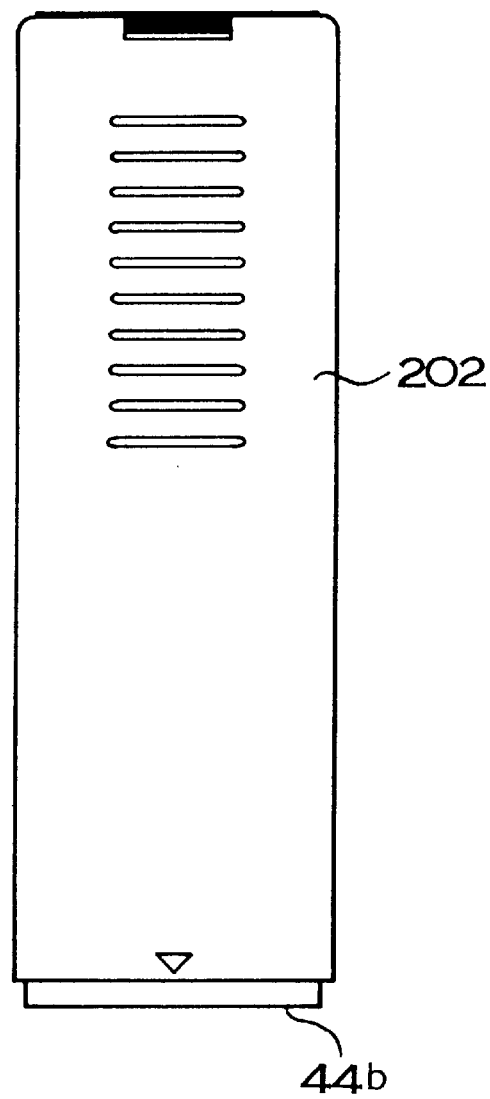
FIGS. 4(A) and 4(B) are a side elevation view and a bottom view of the third embodiment of the present invention.
Figure 4:
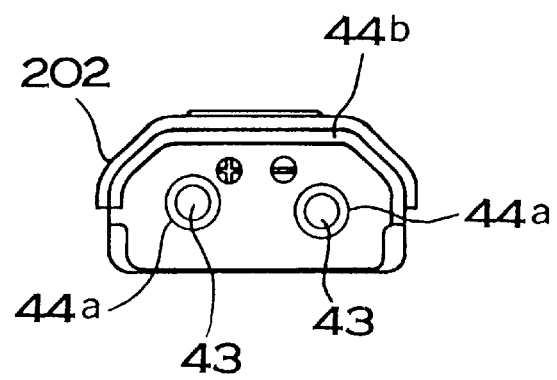
Figure 5:
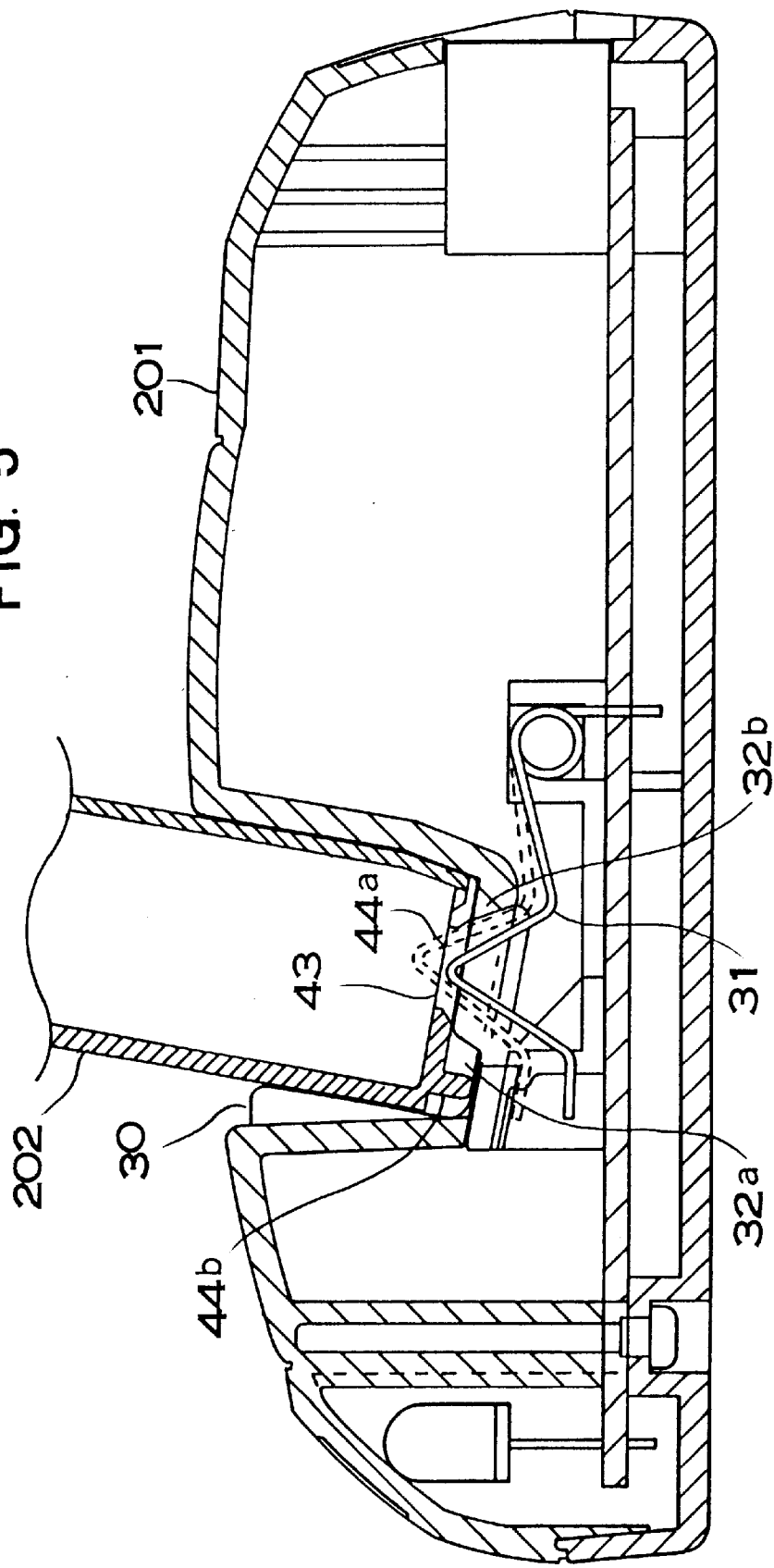
FIG. 5 is a perspective view of the third embodiment of the present invention showing a correct battery connection condition.

Next, FIG. 3 to FIG. 6 show a third embodiment of the present invention. With reference first to FIG. 3 and FIG. 5, a charger body 201 has a connecting part 30, constituted by a slot provided in an upper face of the charger body 201, for connection of the battery back 202. A pair of charging terminals 31, each formed by a suitable bent metallic wire, elastically protrude from a bottom part of the connecting part 30.

A body slot 32a and catch 32b are located between the charging terminals 31. The body slot 32a is provided across about half the periphery of a bottom face of the connecting part 20 surrounding the charging terminals 31. The body catch 32b is located adjacent the charging terminals 31 and protrudes from the bottom face of the connecting part 30.

On the other hand, referring to FIG. 4, in the battery pack 202, a pair of battery terminals 43 are provided at a connecting face of the battery pack 202 to face towards the connecting part 30. A battery slot 44a and catch 44b are located on the connecting face of the battery pack 202. The battery slot 44a is located at the position where the pair of battery terminals protrude, and the battery catch 44b is provided across about half the periphery of the connecting face of the battery pack 202 surrounding the battery terminals 43.

With this structure, as shown in the FIG. 5, when the battery pack 202 is correctly connected in the charger body 201, the body slot 32a and catch 32b of the charger body 201 and the battery catch 44b and slot 44a of the battery pack 202 are in a suitable fitting condition, the battery pack 202 is connected to the charger body 201, and the charging terminals 31 and the battery terminals 43 are electrically connected.

Figure 6:
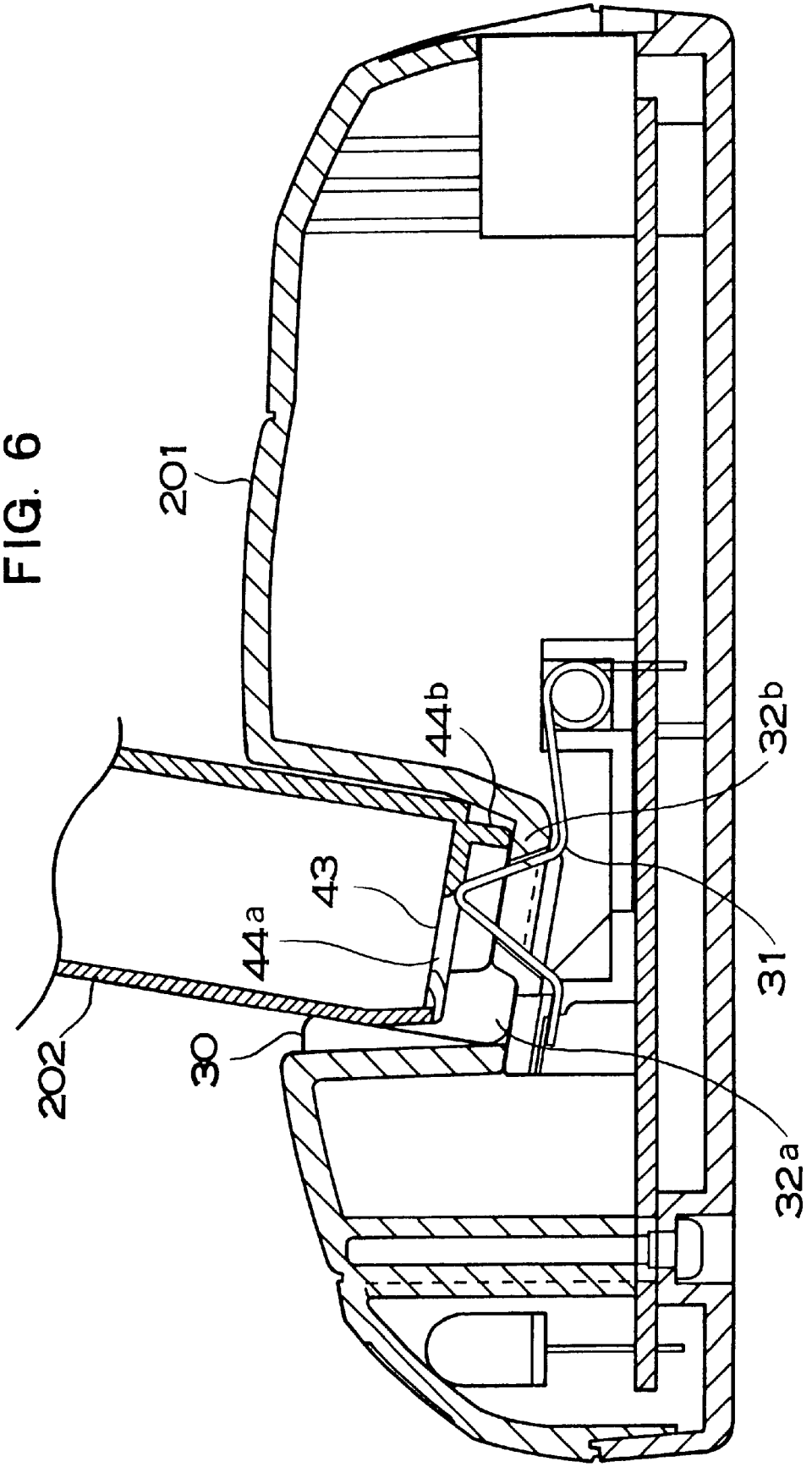
FIG. 6 is a perspective view of the third embodiment of the present invention showing an incorrect battery connection condition.

On the contrary, as shown in FIG. 6, when the battery pack 202 is inversely placed in connecting part 30 of the charger body 201, the body slot 32a and catch 32b of the charger body 201 and the battery slot 44a and catch 44b of the battery pack 202 do not fit together, because the catch 32b of the charger body 201 and the battery catch 44b of the battery pack 202 are in facing contact. The combined height of the catches 32b and 42b is such that, when they are in facing contact, the battery terminals 43 and the charging terminals 31 cannot move close enough together to contact each other and, thus, the charging terminals 31 and the battery terminals 43 cannot electrically connect. Therefore, these terminals cannot be placed in an inversely connected condition.

As this invention may be embodied in several forms without departing from the spirit of the present invention, the above-described embodiments are therefore illustrative and not restrictive, since the scope of the invention is defined by the appended claims rather than by the description preceding them. Therefore, all changes that fall within the metes and bounds of the claims, or equivalents thereof, are intended to be embraced by the claims.

I claim:

1. A battery charging apparatus for use in charging a rechargeable battery having battery terminals and a battery slot and catch arrangement, said battery charging apparatus comprising:

a charger body having a battery connecting part;

wherein said connecting part of said charger body is provided with charger terminals for electrical connection with the battery terminals of the battery;

wherein said connecting part of said charger body is provided with a body slot and catch arrangement which, when the battery is mounted to said connecting part of said charger body in a correct orientation, matches with the battery slot and catch arrangement of the battery and allows the battery terminals of the battery to electrically connect with said charger terminals of said connecting part and, when the battery is mounted to said connecting part of said charger body in an incorrect orientation, does not match with the battery slot and catch arrangement of the battery and prevents the battery terminals of the battery from electrically connecting with said charger terminals of said connecting part;

wherein said connecting part comprises a connecting recess in said charger body;

wherein said body slot and catch arrangement comprises a body slot and a body catch; and wherein said body slot comprises an upwardly opening groove formed about an inner peripheral portion of said connecting recess.

2. A battery charging apparatus as recited in claim 1, wherein each of said charger terminals comprises an elastic member projecting above said body catch.

3. A battery charging apparatus as recited in claim 1, wherein said connecting recess has an upwardly facing bottom wall surrounded on all sides by upstanding walls including a front wall, a rear wall facing said front wall along a first direction, and two opposing sidewalls facing one another along a second direction substantially perpendicular to said first direction.

4. A battery charging apparatus as recited in claim 3, wherein said body catch comprises a pair of projections projecting upwardly from said upwardly facing bottom wall of said recess; and said charger terminals project upwardly through top faces of said projections, respectively.

5. A battery charging apparatus as recited in claim 4, wherein said charger terminals comprise elastically movable members elastically pressable downwardly into said projections.

6. A battery charging apparatus as recited in claim 4, wherein said projections are spaced apart from one another along said second direction; and said upwardly opening groove is formed about the inner peripheral portion of said connecting recess so as to surround said projections on three sides thereof.

7. A battery charging apparatus as recited in claim 3, wherein said upwardly opening groove abuts said front wall of said connecting recess; and said projections abut said rear wall of said connecting recess.

8. A battery charging apparatus as recited in claim 1, further comprising the rechargeable battery having the battery terminals and the battery slot and catch arrangement;

wherein said battery slot and catch arrangement comprises a battery slot and a battery catch;

wherein said battery catch comprises an elongated projection projecting downwardly from said battery and engageable in said upwardly opening groove; and wherein said body catch is engageable in said battery slot.

9. A battery charging apparatus for use in charging a rechargeable battery having battery terminals and a battery slot and catch arrangement, said battery charging apparatus comprising:

a charger body having a battery connecting part;

wherein said connecting part of said charger body is provided with charger terminals for electrical connection with the battery terminals of the battery;

wherein said connecting part of said charger body is provided with a body slot and catch arrangement which, when the battery is mounted to said connecting part of said charger body in a correct orientation, matches with the battery slot and catch arrangement of the battery and allows the battery terminals of the battery to electrically connect with said charger terminals of said connecting part and, when the battery is mounted to said connecting part of said charger body in an incorrect orientation, does not match with the battery slot and catch arrangement of the battery and prevents the battery terminals of the battery from electrically connecting with said charger terminals of said connecting part;

wherein said body slot and catch arrangement comprises a body slot and a body catch provided on said connecting part;

wherein said body slot and said body catch are located between said charger terminals; and wherein said body catch comprises a projection spaced apart from said body slot.

10. A battery charging apparatus as recited in claim 9, wherein said connecting part comprises a recess in said charger body defined between vertically upstanding sidewalls extending in a first direction and facing one another along a second direction substantially perpendicular to said first direction.

11. A battery charging apparatus as recited in claim 10, wherein said charger terminals are spaced apart from one another along said second direction; and said body slot and said body catch are spaced apart from one another along said second direction.

12. A battery charging apparatus as recited in claim 11, wherein said connecting part comprises an upwardly facing connecting face disposed between said upstanding sidewalls;

said body catch projects upwardly from said connecting face; and said body slot opens upwardly through said connecting face.

13. A battery charging apparatus as recited in claim 10, wherein said connecting part comprises an upwardly facing connecting face disposed between said upstanding sidewalls;

said body catch projects upwardly from said connecting face; and said body slot opens upwardly through said connecting face.

14. A battery charging apparatus as recited in claim 9, further comprising the rechargeable battery having the battery terminals and the battery slot and catch arrangement;

wherein said battery slot and catch arrangement comprises a battery slot and a battery catch;

wherein said battery slot and said battery catch are located between said battery terminals; and wherein said battery catch comprises a projection spaced apart from said battery slot.

15. A battery charging apparatus for use in charging a rechargeable battery having battery terminals and a battery slot and catch arrangement, said battery charging apparatus comprising:

a charger body having a battery connecting part;

wherein said connecting part of said charger body is provided with charger terminals for electrical connection with the battery terminals of the battery;

wherein said connecting part of said charger body is provided with a body slot and catch arrangement which, when the battery is mounted to said connecting part of said charger body in a correct orientation, matches with the battery slot and catch arrangement of the battery and allows the battery terminals of the battery to electrically connect with said charger terminals of said connecting part and, when the battery is mounted to said connecting part of said charger body in an incorrect orientation, does not match with the battery slot and catch arrangement of the battery and prevents the battery terminals of the battery from electrically connecting with said charger terminals of said connecting part;

wherein said body slot and catch arrangement comprises a groove and a projection aligned with one another along a line extending in a first direction; and wherein said charger terminals are spaced apart from one another along a second direction substantially perpendicular to said first direction.

16. A battery charging apparatus as recited in claim 15, wherein said groove and said projection are located between said charger terminals.

17. A battery charging apparatus as recited in claim 15, wherein said connecting part comprises a recess in said charger body defined between vertically upstanding sidewalls extending in said first direction and facing one another along said second direction, and a rear wall extending in said second direction and facing in said first direction, said recess having an upwardly facing connecting face.

18. A battery charging apparatus as recited in claim 17, wherein said groove is formed in said rear wall and opens forwardly; and said projection projects forwardly from said rear wall.

19. A battery charging apparatus as recited in claim 18, wherein said projection also projects upwardly from said connecting face.

20. A battery charging apparatus as recited in claim 18, wherein said groove is formed in said rear wall and opens forwardly; and said projection projects upwardly from said connecting face.

21. A battery charging apparatus as recited in claim 18, wherein at least one protrusion protrudes inwardly from one of said sidewalls.

22. A battery charging apparatus as recited in claim 15, further comprising the rechargeable battery having the battery terminals and the battery slot and catch arrangement; and wherein said battery slot and catch arrangement comprises a battery slot in which said projection is engageable, and a battery catch engageable in said groove.

23. A battery charging apparatus for use in charging a rechargeable battery having battery terminals and a battery slot and catch arrangement, said battery charging apparatus comprising:

a charger body having a battery connecting part;

wherein said connecting part of said charger body is provided with charger terminals for electrical connection with the battery terminals of the battery;

wherein said connecting part of said charger body is provided with a body slot and catch arrangement which, when the battery is mounted to said connecting part of said charger body in a correct orientation, matches with the battery slot and catch arrangement of the battery and allows the battery terminals of the battery to electrically connect with said charger terminals of said connecting part and, when the battery is mounted to said connecting part of said charger body in an incorrect orientation, does not match with the battery slot and catch arrangement of the battery and prevents the battery terminals of the battery from electrically connecting with said charger terminals of said connecting part;

wherein said connecting part comprises a recess in said charger body defined between vertically upstanding sidewalls extending in a first direction and facing one another along a second direction substantially perpendicular to said first direction, and a rear wall extending in said second direction and facing in said first direction, said recess having an upwardly facing connecting face; and wherein said body slot and catch arrangement comprises a groove formed in said rear wall and opening forwardly, and a projection projecting forwardly from said rear wall.

24. A battery charging apparatus as recited in claim 23, wherein said projection also projects upwardly from said connecting face.

25. A battery charging apparatus as recited in claim 23, wherein said charger terminals are spaced apart from one another in said second direction; and said projection and said groove are disposed between said charger terminals.

26. A battery charging apparatus as recited in claim 23, further comprising the rechargeable battery having the battery terminals and the battery slot and catch arrangement; and wherein said battery slot and catch arrangement comprises a battery slot in which said projection is engageable, and a battery catch engageable in said groove.

* * * * *